United States Patent
Dwan et al.

(10) Patent No.: US 9,954,935 B2
(45) Date of Patent: *Apr. 24, 2018

(54) ENRICHING CONTACT DATA BASED ON CONTENT SHARING HISTORY IN A CONTENT MANAGEMENT SYSTEM

(71) Applicant: Dropbox, Inc., San Francisco, CA (US)

(72) Inventors: Michael Dwan, Boulder, CO (US); Alon Levi, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/253,462

(22) Filed: Aug. 31, 2016

(65) Prior Publication Data

US 2016/0373518 A1    Dec. 22, 2016

Related U.S. Application Data

(63) Continuation of application No. 14/245,952, filed on Apr. 4, 2014, now Pat. No. 9,460,210.

(51) Int. Cl.
*H04L 29/08* (2006.01)
*G06F 17/30* (2006.01)
*G06Q 10/00* (2012.01)

(52) U.S. Cl.
CPC ........ *H04L 67/10* (2013.01); *G06F 17/30864* (2013.01); *G06Q 10/00* (2013.01); *H04L 67/22* (2013.01); *H04L 67/306* (2013.01); *H04L 67/02* (2013.01)

(58) Field of Classification Search
CPC ....... H04L 67/10; H04L 67/306; H04L 67/22; H04L 67/02; G06Q 10/00; G06F 17/30864

See application file for complete search history.

(56) References Cited

U.S. PATENT DOCUMENTS

| | | | |
|---|---|---|---|
| 7,991,764 B2 | 8/2011 | Rathod | |
| 8,005,057 B2 | 8/2011 | Lim | |
| 8,122,072 B2 | 2/2012 | Amano et al. | |
| 8,161,419 B2 | 4/2012 | Palahnuk et al. | |
| 8,364,720 B2 | 1/2013 | Levy | |

(Continued)

FOREIGN PATENT DOCUMENTS

| WO | WO 0190933 | 11/2001 | |
|---|---|---|---|
| WO | WO 0190933 A1 * | 11/2001 | ....... G06F 17/30581 |
| WO | WO 2013/078075 | 5/2013 | |

*Primary Examiner* — Uzma Alam
(74) *Attorney, Agent, or Firm* — Fenwick & West LLP

(57) ABSTRACT

A content management system enriches contact records obtained from a client device using user records stored on the content management system. The content management system receives contact records from a client device authorized on a user account of the content management system. The content management system compares contact records with user profiles stored on the content management system. The content management system matches contact records with user profiles of user accounts with which at least one sharing event occurred between the user account and the user account on which the client device is authorized. The content management system identifies a matching user profile corresponding to the contact record. The content management system determines modification information for modifying the contact record based upon the matching user profile.

20 Claims, 4 Drawing Sheets

(56) References Cited

U.S. PATENT DOCUMENTS

| | | | |
|---|---|---|---|
| 8,484,241 B2 | 7/2013 | Bouse et al. | |
| 8,676,123 B1* | 3/2014 | Hinkle | H04M 1/274508 |
| | | | 455/41.2 |
| 2006/0288297 A1* | 12/2006 | Haitani | G06F 1/1632 |
| | | | 715/739 |
| 2008/0119201 A1* | 5/2008 | Kolber | H04W 8/18 |
| | | | 455/456.1 |
| 2009/0234876 A1 | 9/2009 | Schigel et al. | |
| 2010/0178953 A1* | 7/2010 | Blewett | H04L 51/38 |
| | | | 455/550.1 |
| 2011/0161343 A1* | 6/2011 | Schimpf | G06F 17/30398 |
| | | | 707/769 |
| 2013/0246449 A1* | 9/2013 | Balannik | G06F 17/30345 |
| | | | 707/758 |
| 2014/0066044 A1* | 3/2014 | Ramnani | H04W 8/24 |
| | | | 455/418 |
| 2014/0222793 A1* | 8/2014 | Sadkin | G06F 17/3053 |
| | | | 707/723 |
| 2015/0038233 A1* | 2/2015 | Rom | A63F 13/42 |
| | | | 463/42 |

* cited by examiner

ENRICHING CONTACT DATA BASED ON CONTENT SHARING HISTORY IN A CONTENT MANAGEMENT SYSTEM

CROSS-REFERENCE TO RELATED APPLICATION

This application is a continuation of U.S. patent application Ser. No. 14/245,952, filed on Apr. 4, 2014, now U.S. Pat. No. 9,460,210, which is incorporated by reference in its entirety.

TECHNICAL FIELD

Disclosed embodiments relate to enriching contact data information for a client device of a user based on content sharing history between users in a content management system.

BACKGROUND

Contact lists are used to store contact information for individuals and businesses. Users typically add a new contact to their contact list when they are introduced to another person or meet the other person in some social context. In many cases, the information for a contact in the contact list is incomplete. For example, a contact may include just a person's first name and telephone number, but lack the person's last name, email address, business address, or fax number.

Incomplete information can be used for some purposes but may not be useful for other purposes. For example, if the contact information for a person includes only an email address, the user does not have the phone number to call that person or the address to send a letter by mail. Users who own multiple client devices, for example, smartphone, tablet, laptop, etc., may store inconsistent information in contact lists across different client devices, such as different contacts in contact lists, or the same contact with different information. To summarize, contact information stored in client devices of a user may have missing information and/or inconsistent information.

SUMMARY

Embodiments of a content management system allow enrichment of contacts obtained from a client device. The content management system is configured to enable users to share content items with other users. The content management system maintains an account for each user. The account for a user includes a user profile having contact information for the user. The content management system also maintains a share history describing instances where users shared content items with other users.

To modify a given user's contact list, the content management system receives a contact list from a client device of a user of the system. The content management system identifies from the share history a set of other users with whom the given user has shared content items using the content management system. The content management system compares the contact information in the contact received from the user with the contact information in the user profiles of each of the other users in the set of user, to identify matching entries. The content management system identifies modifications to contact records in the user's contact list based on the matching user profiles maintained by the system. The modifications can include information to be added to one or more of the user's contact records. For example, the content management system can identify an email address, telephone number, or name in a matching user profile, which fields are not present in the user's contact record. The modification information is then provided to the client device, which uses the modification information to update a contact record.

The features and advantages described in this summary and the following detailed description are not exhaustive. Many additional features and advantages will be apparent to one of ordinary skill in the art in view of the drawings, specification, and claims hereof.

The figures show various embodiments for purposes of illustration only. One skilled in the art will recognize from the following description that alternative embodiments of the structures and methods shown may be used without departing from the principles of this invention.

DETAILED DESCRIPTION

System Overview

Figure 1:
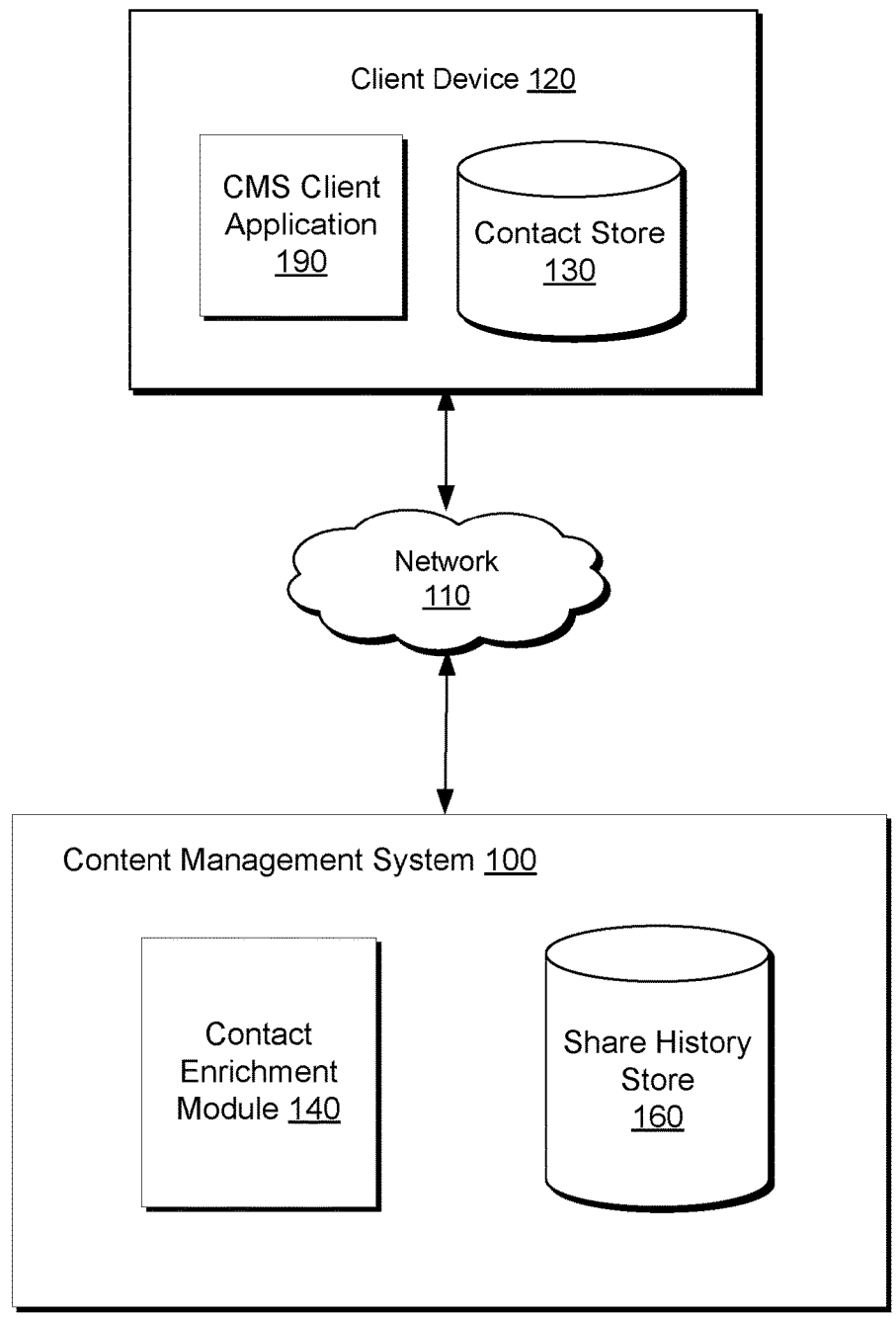
FIG. 1 shows a system environment of a content management system, according to one embodiment.

FIG. 1 shows a system environment of a content management system, according to one embodiment. As shown in FIG. 1, content management system 100 and client device 120 are communicatively connected by network 110. Content management system 100 provides content storage, sharing, and synchronization services for users of client devices 120. Generally, these services allow a user to access their content stored in content management system 100 from any of their client devices 120 and allow users to share content with other users of client devices 120.

In addition to content storage and sharing, content management system 100 can update shared content responsive to changes in the content. A user may use content management system 100 to synchronize content across multiple client devices 120 owned by the user and associated with the user's account. A user may share content that can be synchronized with devices associated with other users' accounts. Content stored by content management system 100 can include any type of data, such as digital data, documents, media content (e.g., images, photos, videos, audio files, streaming content), data files and databases, source code, object code, recordings, and any other type of data or file, hereinafter collectively referred to as "content items." Content stored by content management system 100 may be organized in folders, tables, collections, albums, playlists, or in other database structures (e.g., object oriented databases, key/value etc.). In the environment of FIG. 1, client device 120 accesses shared content stored on content management system 100 using content management system (CMS) client application 190.

Contact store 130 stores contact records for various persons or entities, for example, businesses, organizations and the like. Contact records store information useful for contacting a person or entity, for example, address, telephone numbers (work, home, mobile, and other telephone numbers), email address(es), and so on. Contact records may also include other type of information describing a person or entity, for example, a website, an image, and so on. Each contact record may be represented as a tuple with fields corresponding to fields of the contact. A contact record may have only some fields populated. For example, a contact record may have name and phone numbers populated but no email address whereas another contact record may have name and email address populated but no phone numbers.

In some embodiments, a user may import contact records from an external application that maintains a contact list for a user independently of content management system 100. Examples of such external applications includes applications executing on the client device, such as email applications, contact managers, telephone dialers, personal information managers, as well as hosted or network application such a social networking system, for example, FACEBOOK™, or a web-based email system, such as GMAIL™. If a contact record is imported from an external application, it may include information identifying the application from which the contact record was imported. It may also include an identifier for the contact record that uniquely identifies the contact record in the external application. In some embodiments, contact records for such external application may be maintained by a client side application different from CMS client application 190. For example, contact records may be maintained by an email client such as MICROSOFT CORP.'s OUTLOOK™.

Although only a single client device 120 is shown, there can be any number of client devices 120 in communication with content management system 100 at any time. Various types of devices can function as a client device, such as desktop computer, tablet computer, and mobile device. Any device capable of accessing content management system 100 and interacting with content items stored on content management system 100 may be used as client device 120.

Users create accounts in content management system 100 and store content in content management system 100 by transmitting content from client device 120 to content management system 100. Users may also provide content to content management system 100 by (for example) requesting sharing of content items from other content providers to content management system 100. Content stored by users in content management system 100 is associated with user accounts that may have various privileges. The privileges include viewing content items, modifying content items, modifying user privileges related to content items, deleting content items, and sharing content items with other users. A user's account includes a user profile that has contact information for the user, for example, a user's first and last name, and at least one email address, and may include other information, such as business name, telephone numbers, title, address, and so forth.

Content management system 100 maintains share history store 160 that stores information describing sharing of content by a user with one or more other users of content management system 100. In an embodiment, share history store 160 stores a share record or a tuple for each instance of content sharing performed using the content management system 100. The share record includes fields, for example, a source user that shared content, one or more target users that received the content, content that was shared, and the time at which the content was shared. The share history may be stored in a database table indexed by various fields, for example, a source user identifier, a target user identifier, a content identifier (e.g., a file name), and so forth.

Content management system 100 includes contact enrichment module 140 that determines information to be used to modify contact records obtained from client device 120. In one embodiment, content management system 100 imports contacts from a client device 120. Contact enrichment module 140 analyzes the imported contacts using information stored in share history store 160 to determine information that is not available in the received contacts. Content management system 100 may modify the received contacts based on the information determined from the share history store to generate enriched contacts.

Client devices 120 communicate with content management system 100 through network 110. Network 110 may be any suitable communications network for data transmission. In one embodiment, network 110 includes portions over the Internet and uses standard communications technologies and/or protocols. Thus, network 110 can include both wired (e.g., Ethernet) and wireless (e.g., 802.11, 802.16) physical layers, as well various transport (e.g., TCP, UDP), network (e.g., IP), session (e.g., TLS, SSL), and application layer (e.g., HTTP) protocols. No particular implementation of network 110 is required by the disclosed embodiments, other than the ability of client device 120 and content management system 100 to communicate with each thereby. In another embodiment, content management system 100 and client devices 120 use custom and/or dedicated data communications technologies instead of, or in addition to, the ones described above.

Figure 2:
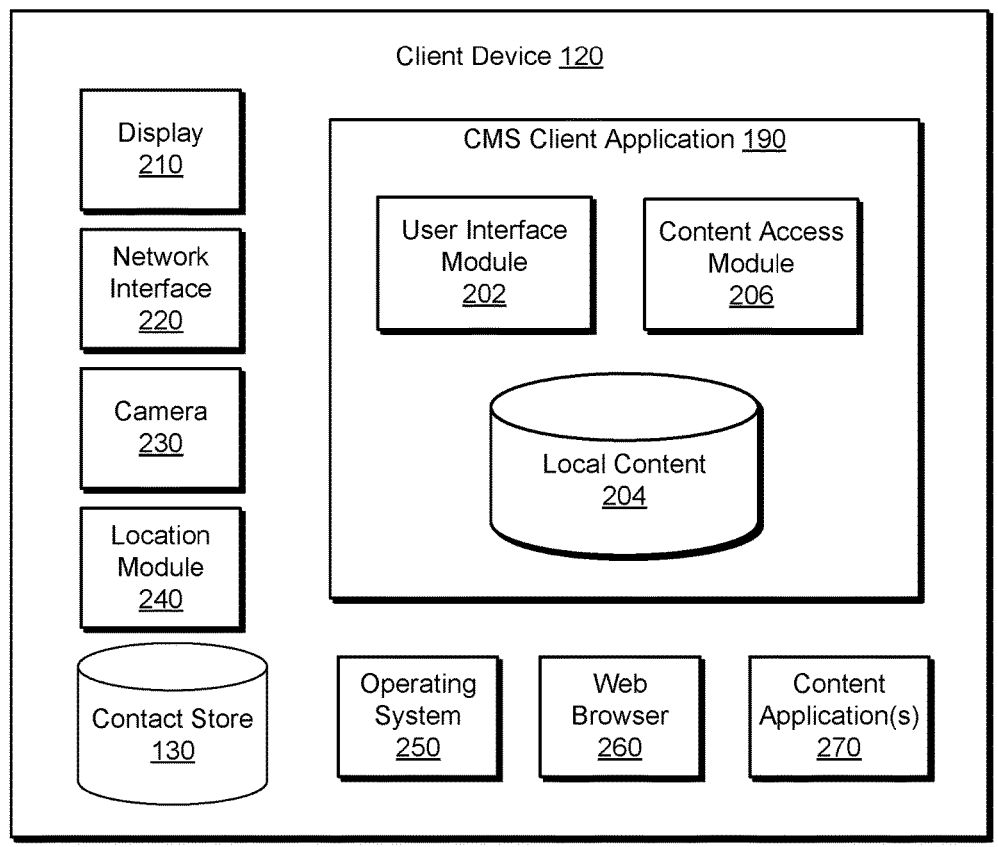
FIG. 2 shows components of a client device, according to one embodiment.

FIG. 2 shows components of client device 120 according to an embodiment. Client device 120 includes modules for interacting with content management system 100 and with a user of client device 120. Client device 120 includes display 210, network interface 220, camera 230, location module 240, contact store 130, operating system 250, web browser 260, content applications 270, and CMS client application 190. Other conventional components of client device 120 that are not material are not shown, for example, processors, local fixed memory (RAM and ROM), as well as optionally removable memory (e.g., SD-card), power sources, and audio-video outputs.

Display 210 allows client device 120 to present information to a user. In certain client devices 120, display 210 can be a touchscreen. Network interface 220 allows client device 120 to communicate with content management system 100 via network 110. Content applications 270 include applications for creating, viewing, processing, and/or modifying content stored on content management system 100. Examples of content applications 270 include word processors, database management systems, code editors, image and video editors, e-book readers, and audio and video players. Operating system 250 provides a local file management system and executes various software modules such as CMS client application 190.

Client devices 120 access content management system 100 in a variety of ways. CMS client application 190 can be a dedicated application or module that provides access to the services of content management system 100. CMS client application 190 may provide user access to shared files through a user interface as well as programmatic access for other applications. Client device 120 may also provide access to content management system 100 through web browser 260. As an alternative, CMS client application 190 may integrate access to content management system 100 with the local file management system provided by operating system 250. When access to content management system 100 is integrated in the local file management system, a file organization scheme maintained at content management system 100 can be represented as a local file structure by operating system 250 in conjunction with CMS client application 190. CMS client application 190 may take various forms, such as a standalone application, an application plug-in, or a browser extension.

CMS client application 190 includes user interface module 202, local content 204, and content access module 206. User interface module 202 of CMS client application 190 generates an interface to content accessed by CMS client application 190. The generated interface is provided to the user by display 210. Local content 204 stores content accessed from content management system 100 by CMS client application 190. Content access module 206 of CMS client application 190 manages updates to local content 204 and communicates with content management system 100 to synchronize content modified by client device 120 with content maintained on content management system 100.

In certain embodiments, client device 120 includes additional components such as camera 230 and location module 240. Camera 230 may be used to capture images or video for uploading to the content management system 100. Location module 240 determines the location of client device 120, using for example, a global positioning satellite signal, cellular tower triangulation, or other methods. Location module 240 may be used by CMS client application 190 to obtain location data and add the location data to metadata about a content item, for example, an image captured by camera 230.

Figure 3:
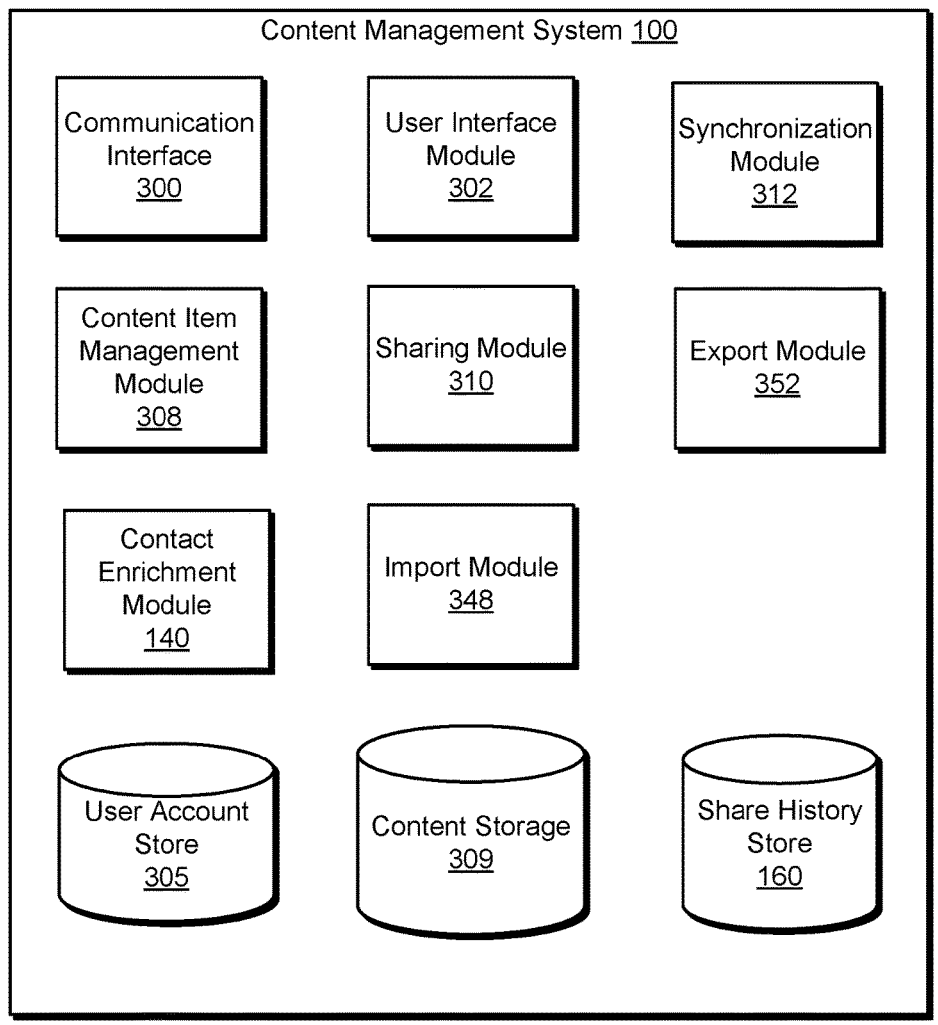
FIG. 3 shows components of a content management system, according to one embodiment.

FIG. 3 shows components of content management system 100 according to one embodiment. Content management system 100 includes communication interface 300, user interface module 302, content item management module 308, sharing module 310, synchronization module 312, import module 348, export module 352, contact enrichment module 140, user account store 305, content storage 309, and share history store 160.

Communication interface 300 enables content management system 100 to interface with various client devices 120, and with other content and/or service providers via an application programming interface (API). Certain software applications access content stored by content management system 100 via an API. For example, an application can programmatically make calls directly to content management system 100, when a user provides credentials, to read, write, create, delete, share, or otherwise manipulate content. Similarly, the API can provide access to content stored by content management system 100 through a web site.

User interface module 302 generates a web interface that allows a user to view or manipulate content. For example, the user can navigate in web browser 260 to a web address provided by content management system 100. Changes or updates to content stored by content management system 100 made through the web interface, for example, by uploading a new version of a file are synchronized with client devices 120 authorized for the user's account.

User account store 305 stores information describing users. The user account store 305 stores user profiles containing contact information for each user including, name, email address, telephone numbers, website, physical address, and so on. User account store 305 may store additional information for users, for example, demographic information, payment information, and so on. Each user can be associated with an identifier, such as a user ID or a user name. User account store 305 can also include account management information, such as account type, e.g. free or paid; usage information for each user, e.g., file edit history and file access history from each client device 120 used by the user; maximum storage space authorized; storage space used; content storage locations; security settings; personal configuration settings; content sharing data; etc.

User account store 305 also stores information identifying client devices 120 authorized for each user account; for example, a user may authorize her smartphone, office desktop computer, and personal laptop computer to access her account and content therein. User account store 305 stores privacy settings for a user account. The privacy settings of a user account identify other users with whom information of the user profile may be shared. In some embodiments, the user account identifies one or more specific fields of the user profile as being public, and so can be shared by content management system 100 with any other user). In other embodiment, the fields of the user account identified, for example, as being either public, permitted (can be shared on a case by case basis upon notification to the user), or prohibited (cannot be shared with other users at all).

The user account store 305 stores user profiles using a representation that allows identifying a user profile given a value of a field of the user profile. For example, the user account store 305 may store a hash table that maps a field of the user profiles to user profiles. Alternatively, the user profiles may be stored as a database table indexed by fields. For example, one index may be created for a column storing email address, another index created for the column storing home phone number, another index created for the column storing mobile phone number, and so on.

Content storage 309 stores content items and is one means for performing this function. Content storage 309 can be a storage device, multiple storage devices, or a server. Alternatively, content storage 309 can be storage in cloud or network storage accessible via a communication network. In one configuration, content management system 100 stores the content items in the same organizational structure as they appear on client device 120. However, content management system 100 can store the content items in its own order, arrangement, or hierarchy.

Content storage 309 may also store metadata describing content items, content item types, and the relationship of content items to various accounts, folders, or groups. In one configuration, each content item stored in content storage 309 can be assigned a system-wide unique identifier. Content storage 309 can decrease the amount of storage space required by identifying duplicate files or duplicate segments of files. For example, a content item may be shared among different users by including identifiers of the users within metadata of the content item (e.g., an ownership list), while storing only a single copy of the content item and using pointers or other mechanisms to link duplicates with the single copy.

Content item management module 308 maintains a content directory that identifies the location of each content item in content storage 309. Content item management module 308 allows client applications 190 to request access to content items in content storage 309. A content entry in the content directory can also include a content pointer that identifies the location of the content item in content storage 309. In some embodiments, the content entry includes multiple content pointers that point to multiple locations, each of which contains a portion of the content item.

Sharing module 310 manages sharing of content publicly or privately. Sharing module 310 stores records describing requests for content sharing processed by the content management system 100 in share history store 160. Sharing content publicly can include making the content item accessible from any client device in network communication with content management system 100. To share content publicly, sharing module 310 generates a custom network address, such as a URL, which allows any web browser to access the content in content management system 100 without any authentication. Sharing module 310 includes content identification data in the generated URL, which can later be used by content management system 100 to properly identify and return the requested content item. For example, sharing module 310 can be configured to include the user account identifier and the content path in the generated URL.

Sharing content privately can include linking a content item in content storage 309 with two or more user accounts so that each user account has access to the content item. In addition to a content path and content pointer, a content entry in some configurations also includes a user account identifier that identifies the user account that has access to the content item. In some embodiments, multiple user account identifiers can be associated with a single content entry indicating that the content item has shared access by the multiple user accounts. To share a content item privately, sharing module 310 adds a user account identifier to the content entry associated with the content item, thus granting the added user account access to the content item.

Sharing module 310 can also be configured to remove user account identifiers from a content entry to restrict a user account's access to the content item. The sharing of a content item can be a read-only share in which the user account with whom the content item is shared has read-only access to the content item. Alternatively, the sharing of the content item can be a read-write share in which the user account with whom the content item is shared has read-write access to the content item.

In an embodiment, if a user requests content management system 100 to share a content item with a target user, the content management system 100 presents a user interface to the user allowing the user to enter information identifying the target user. The user may specify information including an email address, name, address, and so on. In some embodiments, the user interface allows the user to select a target user who is registered with content management system 100 and therefore has a user account with the content management system 100. If the target user is registered with content management system 100, content management system 100 may use communication channels of content management system 100 to share the content. The sharing of content using the communication channels of content management system 100 is referred to as in-band sharing. If the target user does not have an account with the content management system 100, content management system 100 sends a message using channels of communication outside content management system 100. For example, content management system 100 may send an email if the email address of the target user is available or a text message if a phone number of the target user is available. Sharing with users using channels of communications not managed by content management system 100 is referred to as out-of-band sharing.

Synchronization module 312 automatically synchronizes content from one or more client devices. The synchronization can be platform-agnostic. That is, the content can be synchronized across multiple client devices 120 of varying type, capabilities, operating systems, etc. Synchronization module 312 also synchronizes local content at client device 120 with the content items at content management system 100.

Import module 348 allows content management system 100 to import contact records from client devices. Export module 352 allows content management system 100 to export contact records to client devices 120. A client device 120 receiving the contact records may store the received contact records in contact store 130 of the client device. In some embodiments, the export module 352 sends information identifying a contact record and operations to be performed on the contact record to modify the contact record. For example, the export module 352 may send an identifier for a contact record and a set of name-value pairs corresponding to fields to be added in the contact record on the client device 120.

Contact enrichment module 140 matches contact records obtained from a client device 120 with user profiles from user account store 305. The matching of contact records and user profiles is performed by comparing one or more fields of the contact record with corresponding fields from user profiles stored in user account store 305. For example, a contact record may match a user profile if the contact record and the user profile both have the same email address.

Contact enrichment module 140 identifies potential modifications for enriching the information of a contact record imported from client device 120. In one embodiment, contact enrichment module 140 receives contact records obtained from client device 120 authorized for a user. Contact enrichment module 140 analyzes each contact record to identify information that may be added to the contact record from fields of user profiles stored in content management system 100.

Contact enrichment module 140 may enrich a contact record obtained from client device 120 of a given user by providing a value for a field of the contact record that was not present (e.g., an empty field, or a field containing a null value), using information from corresponding fields of a matching user profile. For example, assume that a contact record obtained from client device 120 of a first user includes an email address but does not include a phone number and a first and last name. If the email address in the received contact record matches the email address in a user profile of a second user of content management system 100 with whom the first user has shared contact, and this matching user profile includes a phone number and first and last name, contact enrichment module 140 can enrich the received contact record by adding the phone number and first and last name to that contact record, thus providing new values for fields of the user's contact record that were previously empty. Further details of how contact enrichment module 140 performs enrichment of contacts are described below.

Content management system 100 may be implemented using a single computer, or a network or cluster of computers, including cloud-based computer implementations. The computers are preferably server class computers including one or more high-performance CPUs and 1G or more of main memory, as well as 500 Gb to 2Tb of computer readable, persistent storage, and running an operating system such as LINUX or variants thereof. The operations of content management system 100 as described herein can be controlled through either hardware or through computer programs installed in computer storage and executed by the processors of such server to perform the functions described herein. These systems include other hardware elements used for the operations described here, including network interfaces and protocols, input devices for data entry, and output devices for display, printing, or other presentations of data, but which are not described herein. Similarly, conventional elements, such as firewalls, load balancers, notes servers, failover servers, network management tools and so forth are not shown so as to not obscure the features of the system.

Finally, the functions and operations of content management system 100 are sufficiently complex as to require implementation on a computer system, and cannot be performed in the human mind simply by mental steps.

Enrichment of Contact List

The process of enriching contacts imported from a client device is illustrated using following examples. Each contact record of an imported contact list is represented as a tuple, e.g., name, email address, phone number. A value that is not present is represented as N/A in a tuple. Assume that the contact list is imported from a client device authorized for a user account of a given user named John. Also assume that the following tuples represents contact records imported from John's client device.

(Tom, tom@pqr.com, 555-1111)
(Adam, N/A, 555-2222)
(Mary, mary@pqr.com, N/A)

In the above example, Tom's contact has both email address and phone number available, Adam's contact has name and phone number but no email address, and Mary's contact has name and email but no phone number.

As noted above, share history store 160 stores records of content sharing for each user of content management system 100. The share history is stored as logs of share records that can be represented as tuples, e.g., source user ID, target user ID, content, time of sharing. A user may share a content item with multiple target users. Such sharing events may be represented using multiple tuples, one for each target user. Following are some example tuples illustrating a share history:

(userID1, userID2, doc1, t1)
(userID1, userID3, doc2, t2)
(userID4, userID2, doc3, t3)
(userID1, userID4, doc4, t4)
(userID5, userID3, doc5, t5)

In the above example, the first tuple corresponds to a share record of document doc1 by source user identified by userID1 being shared with target user identified by userID2 at time t1. Other share records store similar information.

The following are some example user profiles as may be stored in the user account store 305. Each user profile is represented as a tuple (user identifier, name, email address, phone number).

(userID1, John, john@pqr.com, N/A)
(userID2, Adam, adam@xyz.com, 555-2222)
(userID3, Nancy, N/A, 555-4444)
(userID4, Mary, mary@pqr.com, 555-6666)
(userID5, Jacob, jacob@pqr.com, N/A)

As shown above, userID1 corresponds to John, from whose client device the contact list was imported. The user profiles of those users with whom John shared documents according to the share history may be used to enrich John's contact list. Note that the share history has logs corresponding to documents shared by other users that are not relevant to enriching contacts of John. According to the share history illustrated above, John shared content with users having user IDs userID2, userID3, and userID4. These correspond to the user profiles of Adam, Nancy, and Mary. Following is the subset of user profiles of users with whom John shared content.

(userID2, Adam, adam@xyz.com, 555-2222)
(userID3, Nancy, N/A, 555-4444)
(userID4, Mary, mary@pqr.com, 555-6666)

One or more fields from the contact records in John's contact list can be matched against one or more fields of these user profiles. The matching can be performed based on fields that identify the records, either individually or in combination. For example, if the email address is used to match contacts with user profiles, the user profile (userID4, Mary, mary@pqr.com, 555-6666) matches the contact record in John's contact list of (Mary, mary@pqr.com, N/A) based on the email address mary@pqr.com. Accordingly, the user profile (userID4, Mary, mary@pqr.com, 555-6666) can be used to enrich the contact record (Mary, mary@pqr.com, N/A) in John's contact list. Based on this match, the enrichment module determines that the phone number 555-6666 can be added to the contact information of Mary.

Similarly, a match of contact records with user profiles based on a second field, e.g., the phone numbers, can be performed. Accordingly, the contact record (Adam, N/A, 555-2222) matches the user profile (userID2, Adam, adam@xyz.com, 555-2222). Based on this match, contact enrichment module can determine that the email address adam@xyz.com can be added to the contact record in John's contact list corresponding to Adam.

The user profiles of users with whom John shared content also shows that John shared content with Nancy corresponding to user profile (userID3, Nancy, N/A, 555-4444). However as shown above, there is no contact record in John's contact list corresponding to Nancy. Accordingly, in one embodiment, the contact enrichment module may add a new contact record (Nancy, N/A, 555-4444) to John's contact list.

Figure 4:
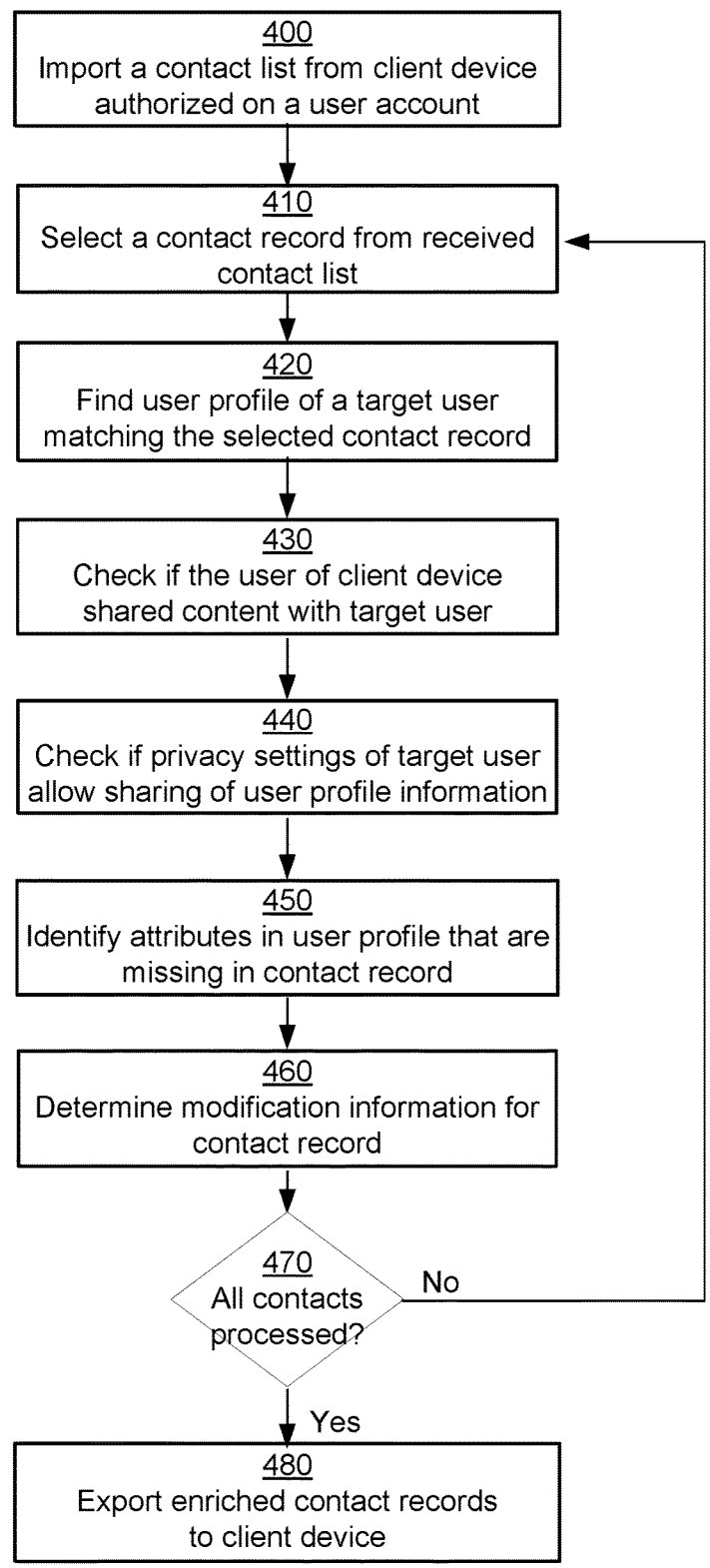
FIG. 4 shows a flowchart illustrating how contact records of a client device are enriched, according to one embodiment.

FIG. 4 shows a flowchart illustrating how contact records obtained from a client device are enriched, according to one embodiment. The steps described herein may be performed by modules other than the modules indicated. Furthermore, steps may be performed in an order different from the order described herein. Import module 348 imports 400 a contact list from a client device authorized on a user account of a first user. The contact list comprises a set of contact records. Contact enrichment module 140 processes the contact records of the contact list to enrich the contact records. Contact enrichment module 140 selects 410 a contact record from the imported contact list for processing.

Contact enrichment module 140 matches 420 the selected contact record with user profiles stored in user account store 305. Contact enrichment module 140 performs the matching by comparing fields of the contact record with fields of user profiles. In an embodiment, contact enrichment module 140 compares fields that are predetermined to uniquely identify user profiles. For example, an email address may be used to perform matching since it uniquely identifies user profiles. In some embodiments, multiple fields may be compared for matching a contact record with a user profile. For example, contact enrichment module 140 may match contact records with user profile by comparing first name, last name, and phone number.

If user account store 305 stores indexes based on fields of user profile, searching for user profiles using these fields can be very efficient. An index allows searching for user profiles given a value of a particular field, for example, email address or a combination of fields, for example, first name and last name. Multiple indexes may be supported by user account store 305 to allow searching using different fields. Use of indexes reduces the search time against a large number of records. An index is implemented using a data structure that allows fast searching across a large number of records, for example, B-tree data structure.

In another embodiment, user account store 305 is implemented using hash tables. Multiple hash tables may be implemented by user account store 305, one hash table corresponding to each attribute or combination of attributes that is used to search for user profiles. Searching for user profiles using a hash table is an efficient process and can retrieve the matching user profile in time independent of the number of user profiles in user account store 305.

Contact enrichment module 140 checks 430 that a user profile considered for matching with the selected contact record corresponds to a user account with which the user account associated with client device 120 shared content using content management system 100, by determining from the share history whether the first user has shared at least one content item with a user account corresponding to the matching user profile. For purposes of discussion, the user account of the first user is referred to as the source user account. The user account associated with a user profile considered for matching with a contact record is referred to as the target user account. Contact enrichment module 140 checks share history store 160 to determine if the source user account and the target user account have shared content. In an embodiment, contact enrichment module 140 checks if share history store 160 includes a record for a sharing event between the source user account and the target user account shared content. The sharing event may represent the source user sharing a content item with the target user. Alternatively, the sharing event may represent the target user sharing a content item with the source user. The sharing event may represent a read-write share or a read-only share. This operation may take place either before or after contact enrichment module 140 actually attempts to match the contact records in the received contact list with the user profiles.

Contact enrichment module 140 also checks 440 the privacy settings of the target user to determine whether the target user has authorized content management system 100 to use information stored in the user profile of the target user to enrich the contact list of client device 120 of source user. If the target user has provided the appropriate authorization to the content management system 100 (e.g., has designated certain fields of the user profile as public), contact enrichment module 140 proceeds to use the user profile of the target user to enrich a matching contact record of the client device 120 of the source user. In embodiments where the target user has designated fields as permitted for use on a case by case basis, contact enrichment module 140 sends a request for permission to use designated fields to the target user; if the target user responds affirmatively to the request, contact enrichment module 140 proceeds to use the user profile of the target user to enrich a matching contact record of the client device 120 of the source user, otherwise contact enrichment module 140 does not use the matching fields of this target user to update the contact record.

Contact enrichment module 140 identifies 450 fields in the user profile that are missing from the contact record received from the client device. For example, contact enrichment module 140 may identify the contact record is missing a phone number that is present in the user profile. Contact enrichment module 140 determines 460 modification information for modifying the contact record in the contact list based on the identified fields. The modification information can be either the updated contact record itself, reflecting all of the revised fields, or it can be just a list of the revision(s) to be made to the contact record. This modification information can be provided to a client device to allow the client device to update the contact information in client device 120.

Contact enrichment module 140 checks 470 if all contact records from the imported contact list have been processed. If there are any unprocessed contact records, contact enrichment module 140 continues the steps 410, 420, 430, 440, 450, 460, and 470 for processing another contact from the contact list.

Export module 352 exports 480 the enriched contact records to client device 120. An enriched contact record may be exported 480 to the client device while other contact records are still being processed. In some embodiments, export module 352 sends modifications performed on a contact record to enrich the contact record instead of sending the enriched contact record itself. For example, if a new value is added to an empty field of a contact record to enrich the contact record, export module 352 can send the name of the field and the new value of the field along with an identifier of the contact record. This allows client device 120 to identify the contact record and make the modifications for enriching the contact record.

Steps of the flowchart of FIG. 4 may be performed in an order different from those indicated in FIG. 4. In an embodiment, contact enrichment module 140 first determines a set of user profiles of users with whom the user of the client device previously shared content. The contact enrichment module 140 removes from this set, user profiles of users whose privacy settings do not allow sharing of user profile information with the user of the client device. Contact enrichment module 140 searches for user profiles that match contact records from the imported contact list against this set of user profiles. This reduces the number of user profiles that are considered for matching against each contact record.

In some embodiments, the information identified for modifying the contact list by the content management system 100 is received by client device 120 and stored in association with the CMS client application 190. The CMS client application 190 generates a view of the contact list that presents a modified contact list that incorporates the modifications received from the content management system 100. In other embodiments, the contact list stored on the client device is modified to incorporate the modifications received from the content management system 100.

In one embodiment, the enriched contact records of the CMS client application 190 are exported to other applications of client device 120 that maintain contact lists. For example, the enriched contact records may be exported to an email client application such as MICROSOFT CORP.'s OUTLOOK™, to a social networking client application, to a web-based contact manager, or to a native contact manager on a smartphone, or the like Additional Configuration Considerations The present invention has been described in particular detail with respect to several possible embodiments. Those of skill in the art will appreciate that the invention may be practiced in other embodiments. Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to computational logic for providing the specified functionality. A module can be implemented in hardware, firmware, and/or software. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description. In addition, the present invention is not restricted to any particular programming language. It will be appreciated that a variety of programming languages may be used to implement the teachings of the present invention, and any references to specific languages are provided for enablement purposes or to describe the best mode.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
   maintaining, by a content management system, a share history, the share history storing sharing records of content items shared between user accounts;
   receiving a contact list associated with a first user account, the contact list including a contact record;
   identifying a second user account having a value of a field of a user profile of the second user account that matches a value of a field of the contact record;
   responsive to identifying the second user account, identifying, by the content management system, from the share history, at least one sharing record of a content item shared between the first user account and the second user account;
   determining, by the content management system, modification information for modifying at least one empty field of the contact record, the modification information comprising a value based on at least one non-empty field in the user profile;
   modifying, by the content management system, the contact record based on the determined modification information; and
   sending the modified contact record to a client device associated with the first user account.

2. The method of claim 1, wherein the at least one empty field is identified by determining that the contact record does not contain a field matching the at least one non-empty field in the user profile.

3. The method of claim 2, wherein sending the modified contact record to the client device comprises sending, to the client device, a new value for adding to the at least one empty field of the contact record.

4. The method of claim 2, wherein sending the modified contact record to the client device comprises sending, to the client device, a modified contact record that contains at least one field having a new value.

5. The method of claim 1, wherein identifying the value of the field of the user profile of the second user account that matches the value of the field of the contact record comprises:
   comparing the field of the user profile of the second user account with the field of the contact record; and
   responsive to determining that the field of the user profile matches the field of the contact record, determining that the user profile matches the contact record.

6. The method of claim 1, wherein determining the modification information is performed responsive to determining that the second user account has authorized sharing user profile information with other users.

7. The method of claim 1, wherein the at least one sharing record represents the first user account sharing a content item with the second user account.

8. The method of claim 1, wherein the at least one sharing record represents the second user account sharing a content item with the first user account.

9. The method of claim 1, wherein receiving the contact list associated with the first user account comprises importing the contact list from an external application that maintains the contact list independently of the content management system.

10. The method of claim 1, further comprising sending the modification information to an application that maintains a contact list independently of the content management system.

11. A non-transitory computer-readable storage medium storing instructions that, when executed by a computing system, cause the computing system to perform operations comprising:
    obtaining a share history, the share history storing sharing records of content items shared between user accounts;
    accessing a contact list associated with a first user account, the contact list including a contact record;
    identifying from the share history, at least one sharing record of a content item shared between the first user account and a second user account;
    determining modification information for modifying at least one empty field of the contact record, the modification information comprising a value based on at least one non-empty field in the user profile;
    modifying, by the content management system, the contact record based on the determined modification information; and
    providing the modified contact record.

12. The computer-readable storage medium of claim 11, wherein the modified contact record is provided to a client device.

13. The computer-readable storage medium of claim 12, wherein the modified contact record is provided to a client device comprises, sending to the client device, a new value for adding to the at least one empty field of the contact record.

14. The computer-readable storage medium of claim 11, wherein identifying the value of the field of the user profile of the second user account that matches the value of the field of the contact record comprises:
   comparing the field of the user profile of the second user account with the field of the contact record; and
   responsive to determining that the field of the user profile matches the field of the contact record, determining that the user profile matches the contact record.

15. The computer-readable storage medium of claim 11, wherein determining the modification information is performed responsive to determining that the second user account has authorized sharing the at least one field from the matching user profile with the first user account.

16. The computer-readable storage medium of claim 11, wherein the sharing record represents one of, the first user account sharing a content item with the second user account or the second user account sharing content item with the first user account.

17. A computer system, comprising:
   a memory and one or more processors implementing a content management system configured to:
      maintain a share history storing sharing records of content items shared between user accounts;
      receive a contact list associated with a first user account, the contact list including a contact record;
      identify a value of a field of a user profile of a second user account that matches a value of a field of the contact record;
      identify, from the share history, at least one sharing record of a content item shared between the first user account and the second user account;
      determine modification information for A) adding at least one field that is not present in the contact record or B) modifying an empty field in the contact record, the modification information comprising a value based on at least one field with a value in the user profile;
      modify the contact record using the modification information, and
      sending the modification information to a client device associated with the first user account, wherein the contact record is updated on the client device based on the modification information.

18. The computer system of claim 17, wherein updating the contact record comprises modifying the at least one field that is not present in the contact record.

19. The computer system of claim 17, wherein identifying the value of the field of the user profile of the second user account that matches the value of the field of the contact record comprises:
   comparing the field of the user profile of the second user with the field of the contact record; and
   responsive to determining that the field of the user profile matches the field of the contact record, determining that the user profile matches the contact record.

20. The computer system of claim 17, wherein determining the modification information is performed responsive to determining that the second user account has authorized sharing the at least one field from the matching user profile with at least one other user.

* * * * *